United States Patent
Salter et al.

(10) Patent No.: US 10,820,174 B1
(45) Date of Patent: Oct. 27, 2020

(54) IDENTIFICATION OF A VEHICLE BASED ON GESTURES OF A POTENTIAL OCCUPANT OF THE VEHICLE

(71) Applicant: Ford Global Technologies, LLC, Dearborn, MI (US)

(72) Inventors: Stuart Salter, White Lake, MI (US); Peter Phung, Windsor (CA); Zeljko Deljevic, Plymouth, MI (US); Hussein Berry, Dearborn, MI (US); Annette Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/533,688

(22) Filed: Aug. 6, 2019

(51) Int. Cl.
| | |
|---|---|
| *H04W 4/40* | (2018.01) |
| *B60Q 9/00* | (2006.01) |
| *B60Q 1/50* | (2006.01) |
| *G06K 9/00* | (2006.01) |
| *G02F 1/163* | (2006.01) |
| *B60J 3/04* | (2006.01) |
| *H04W 4/02* | (2018.01) |
| *B60R 11/04* | (2006.01) |

(52) U.S. Cl.
CPC .............. *H04W 4/40* (2018.02); *B60J 3/04* (2013.01); *B60Q 1/50* (2013.01); *B60Q 9/00* (2013.01); *G02F 1/163* (2013.01); *G06K 9/00335* (2013.01); *H04W 4/023* (2013.01); *B60R 11/04* (2013.01)

(58) Field of Classification Search
CPC . H04W 4/40; H04W 4/023; B60J 3/04; B60Q 1/50; B60Q 9/00; G02F 1/163; G06K 9/00335; B60R 11/04

USPC .............................................. 340/435
See application file for complete search history.

(56) References Cited

U.S. PATENT DOCUMENTS

| | | |
|---|---|---|
| 6,498,970 B2 | 12/2002 | Colmenarez et al. |
| 2006/0261931 A1 | 11/2006 | Cheng |
| (Continued) | | |

OTHER PUBLICATIONS

Kim, et al., "Next Generation Smart Window Display Using Transparent Organic Display and Light Blocking Screen," Optics Express, 2018, vol. 26, No. 7, pp. 8493-8502.

(Continued)

*Primary Examiner* — Omar Casillashernandez
(74) *Attorney, Agent, or Firm* — Brandon Hicks; Eversheds Sutherland (US) LLP

(57) ABSTRACT

Technologies are provided for identification of a vehicle or a condition of the vehicle based on recognition of gestures of a pedestrian in the surrounding of the vehicle. Some embodiments of the technologies utilize multiple devices integrated into the vehicle and include a control unit that can control the operation of at least some of the multiple devices. The control unit can determine that a defined mobile device is within a defined range from the vehicle. In response to such a determination, the control unit can identify a gesture of a pedestrian relative to the vehicle, the pedestrian having the mobile device. The control can then cause at least one of the multiple devices to provide one or more visual signals based at least on the gesture. Such visual signals permit identifying the vehicle, an entry point to the vehicle, a condition of the vehicle, or a combination thereof.

13 Claims, 10 Drawing Sheets

(56) References Cited

U.S. PATENT DOCUMENTS

| | | | |
|---|---|---|---|
| 2015/0251697 A1* | 9/2015 | Lavoie | B62D 13/06 |
| | | | 701/523 |
| 2017/0030118 A1* | 2/2017 | Elie | E05F 15/76 |
| 2017/0030126 A1* | 2/2017 | Elie | E05F 15/70 |
| 2017/0147074 A1* | 5/2017 | Buttolo | B60N 2/0244 |
| 2017/0197636 A1* | 7/2017 | Beauvais | G06F 3/167 |
| 2017/0327082 A1 | 11/2017 | Kamhi et al. | |
| 2018/0196417 A1* | 7/2018 | Iagnemma | G05D 1/0027 |
| 2018/0326982 A1* | 11/2018 | Paris | B60W 50/0097 |
| 2019/0143936 A1* | 5/2019 | Abel Rayan | E05B 81/76 |
| | | | 701/2 |

OTHER PUBLICATIONS

Research Frontiers Incorporated. (2018, Apr. 2017). Smarter Cooking Brought to the Smart Home by Electrolux and Variguard using Research Frontiers SPD-Smart Light-Control Technology (2 pages).

\* cited by examiner

IDENTIFICATION OF A VEHICLE BASED ON GESTURES OF A POTENTIAL OCCUPANT OF THE VEHICLE

BACKGROUND

Some vehicles include electro-chromatic windows that can switch between a tinted state and a transparent state. Such windows are normally tinted to protect from sun load and also to prevent ultraviolet (UV) degradation of interior materials. Such degradation can occur even when UV stabilizers are applied to the interior materials. As such, electro-chromatic windows can prolong the quality of the interior of a vehicle.

In some situations, however, tinted windows can complicate the identification of the vehicle and a condition of the vehicle. For example, tinted windows can make it difficult to visualize identifying markings of a rideshare car, such as drive name or driver likeness. Combined with the typical difficulty of identifying the particular make, model, and color of a rideshare vehicle in a parking lot, a waiting area, or in traffic, tinted windows might discourage the use of at least some rideshare vehicles. More concerning yet, tinted windows can result in unsafe situations when a passenger boards a misidentified vehicle.

Tinted windows also can make it difficult to determine a condition of the interior of a rental car or an available range of the rental car. As a result, a potential occupant of the rental car may not be able to utilize a car in satisfactory condition.

Therefore, much remains to be improved in technologies for the identification of shared vehicles or conditions of such vehicles.

BRIEF DESCRIPTION OF THE DRAWINGS

The accompanying drawings are an integral part of the disclosure and are incorporated into the present specification. The drawings, which are not drawn to scale, illustrate some embodiments of the disclosure. The drawings in conjunction with the description and claims serve to explain, at least in part, various principles, aspects, and practical elements of the disclosure. Some embodiments of the disclosure are described more fully below with reference to the accompanying drawings. However, various aspects and elements of the disclosure can be implemented in many different forms and should not be construed as being limited to the implementations set forth herein. Like numbers refer to like, but not necessarily the same or identical, elements throughout.

DETAILED DESCRIPTION

Overview

The disclosure recognizes and address, amongst other technical challenges, the issue of identification of a vehicle or a condition of the vehicle. To that end, the disclosure provides technologies for identification of the vehicle or a condition of the vehicle based on recognition of gestures of a pedestrian in the surroundings of the vehicle. Some embodiments of the technologies utilize multiple devices integrated into the vehicle and include a control unit that can control the operation of at least some of the multiple devices. The control unit can determine that a defined mobile device is within a defined range from the vehicle. In response to such a determination, the control unit can identify a gesture of a pedestrian relative to the vehicle, the pedestrian having the mobile device. The control can then cause at least one of the multiple devices to provide one or more visual signals based at least on the gesture. Such visual signals permit identifying the vehicle, an entry point to the vehicle, a condition of the vehicle, or a combination thereof. Embodiments of the disclosed technologies also can cause other devices assembled in the vehicle to provide notifications indicating that the mobile device is within the defined distance from the vehicle.

Illustrative Embodiments

Figure 1:
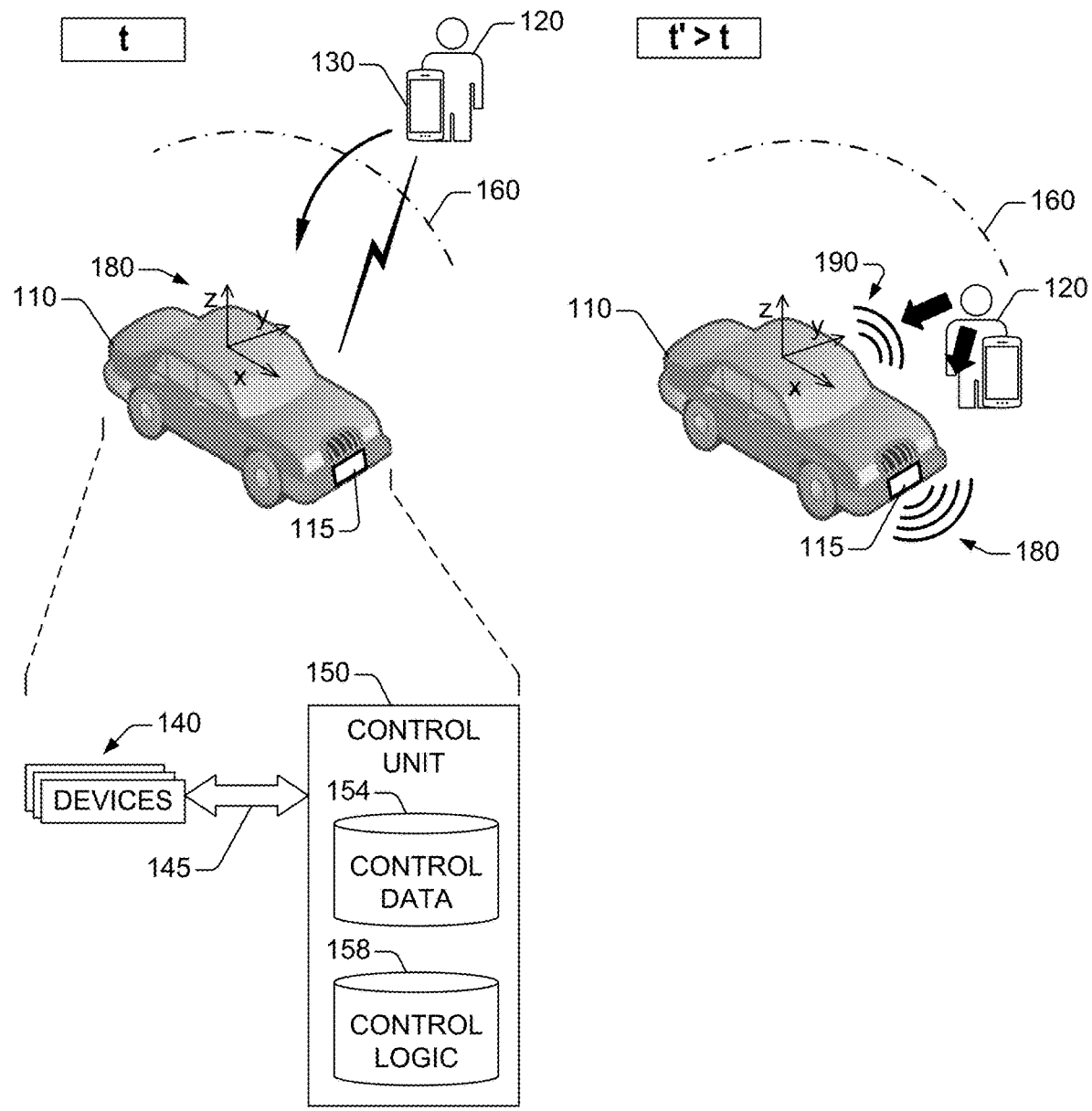
FIG. 1 presents an example of a vehicular scenario involving a vehicle and a mobile device, in accordance with one or more embodiments of this disclosure.

With reference to the drawings, FIG. 1 presents an example of a vehicular scenario involving a vehicle 110 and a mobile device 130 in accordance with one or more embodiments of this disclosure. The vehicle 110 can be, for example, a rideshare vehicle that is parked in passenger loading area. A passenger 120 carries a mobile device 130 and, at a time t, the passenger 120 is moving toward the vehicle 110. The movement of both the passenger 120 and the mobile device 130 is represented by an arrow. Although the vehicle 110 is illustrated as an automobile, the disclosure is not so limited, and the technologies disclosed herein can be applied to other types of vehicles, such as pickup trucks, buses, and similar.

Figure 2:
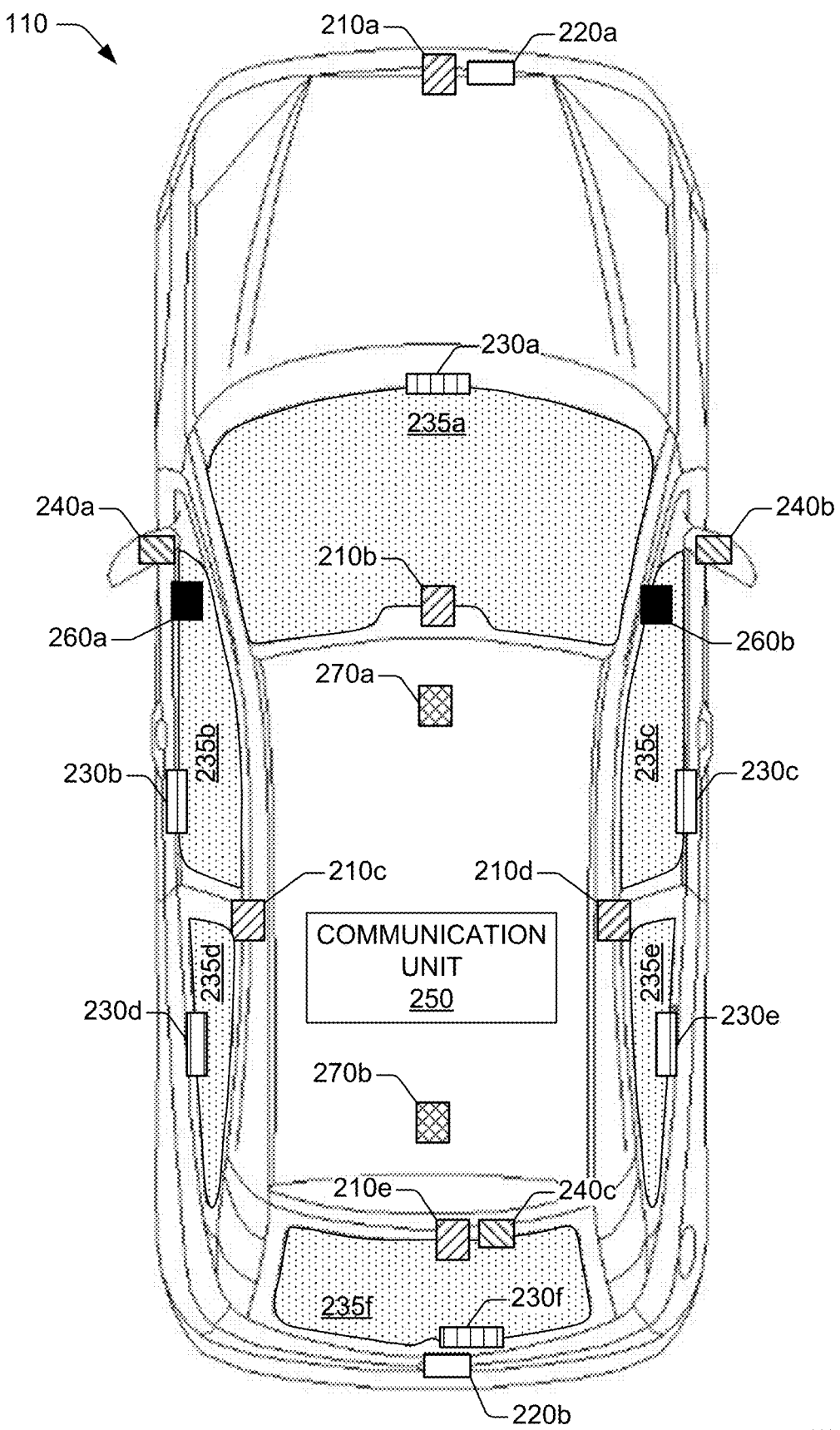
FIG. 2 presents an example of devices assembled in a vehicle for identification of the vehicle or assessment of a condition of the vehicle, in accordance with one or more embodiments of this disclosure.

The vehicle 110 includes multiple devices 140 that provide numerous functionalities, such as wireless communication, emission of sounds, and interior and exterior illumination. Some of the devices 140 are assembled about the vehicle 110, and other ones of the devices 140 are integrated into a cabin of the vehicle 110. For the sake of illustration, FIG. 2 presents an example of the devices 140. The devices 140 include a group of cameras. In the example arrangement illustrated in FIG. 2, the group of cameras includes a first camera 210a assembled near the front end of the vehicle 110. The group of cameras also includes a second camera 210b, a third camera 210c, a fourth camera 210d, and a fifth camera 210e arranged about the vehicle 110, near respective edges of the roof of the vehicle 110. Specifically, the second camera 210b and the fifth camera 210e are arranged proximate to a front window 235a and a rear window 235f, respectively. The third camera 210c and the fourth camera 210d are arranged proximate to respective lateral sides of the vehicle 110.

Each camera in the group of cameras can acquire images of the surroundings of the vehicle 110, for example, using visible light and/or infrared electromagnetic radiation. The acquired images include still pictures or motion pictures, or both. Each camera in the group of cameras can include lenses, filters, and/or other optic elements; one or more focusing mechanisms; and imaging sensors that can generate imaging data representative of the images. The imaging sensors can include one or more photodetectors, active amplifiers, and the like. For instance, the imaging sensor devices can include a charge-coupled device (CCD) camera; an active-pixel sensor or other type of complementary metal-oxide semiconductor (CMOS) based photodetector; an array of multi-channel photodiodes; a combination thereof; or the like.

A camera or an external device can analyze imaging data generated by the camera to detect one or many features in an image. The detected feature(s) can include, for example, a face or a gesture of a pedestrian (e.g., the passenger 120) within the surroundings of the vehicle 110.

The devices 140 also can include antennas that can receive wireless signals according to defined protocols of one or many radio technologies. The radio technologies can include, for example, 3G, Long Term Evolution (LTE), LTE-Advanced, 5G, Wi-Fi (IEEE 802.11, IEEE 802.16, etc.), Bluetooth®, ZigBee, near-field communication (NFC), and similar. The antennas can be arranged in groups assembled about the vehicle 110. As is illustrated in FIG. 2, such groups can include a first group of antennas 240a, a second group of antennas 240b, and a third group of antennas 240c. The first group of antennas 240a is assembled near a first lateral side of the vehicle 110; the second group of antennas 240b is assembled near a second lateral side of the vehicle 110; and the third group of antennas 240c is assembled near the rear end of the vehicle 110.

The groups of antennas included in the devices 140 can be functionally coupled to a communication unit 250. In some embodiments, the group of antennas also can be functionally coupled to one another. The communication unit 250 can include a communication processing device that can process data according to defined protocols of one or many radio technologies. The data can be received in wireless signals collected by one or more groups of antennas (e.g., first group of antennas 240a, a second group of antennas 240b, and/or a third group of antennas 240c).

Using wireless signals received by one or a combination of the groups of antennas, the communication unit 250 can generate an estimate of a distance between a mobile device (e.g., mobile device 130) and the vehicle 110. The communication unit 250 also can generate an estimate of a relative position of the mobile device with respect to the vehicle 110. To that end, the communication unit 250 can implement one or several time-of-flight (TOF) techniques that permit generating the estimate of such a distance and/or an estimate of an angle of arrival of wireless signals from the mobile device.

The devices 140 can further include audio output devices that can generate audible signals or ultrasound signals, or a combination of both. Audible signals can include, for example, a particular tone, a ringtone, or another type of musical sound. Some of the output devices can be assembled in the cabin of the vehicle 110. For example, as is shown in FIG. 2, the audio output devices can include a first speaker device 260a and a second speaker device 260b.

The devices 140 also can include other types of devices assembled in the cabin of the vehicle 110. For example, the devices 140 can include lighting devices that can illuminate the interior of the cabin of the vehicle 110. As is illustrated in FIG. 2, the lighting devices can include a first lighting device 270a and a second lighting device 270b. In some embodiments, each one of the lighting devices can emit visible light. In other embodiments, a first lighting device of the lighting devices can emit visible light, and a second lighting device of the lighting devices can emit light in the ultraviolet (UV) portion of the spectrum of electromagnetic radiation. The second lighting device can be referred to as a cleanliness lighting device because the UV light emitted by such a device can permit observing surface stains that would not be perceived when illuminated using visible light.

The devices 140 still can include other lighting devices assembled in the exterior of the vehicle 110. Such other lighting devices can include a first lighting device 220a assembled proximate to a front end of the vehicle 110, near a first support frame for a license plate. In addition, the other lighting device can include a second lighting device 220b assembled proximate to a read end of the vehicle 110. In some configurations, each one of the lighting devices 220a and 22b can be embodied in a red-green-blue (RGB) lamp or a group of light-emitting diodes (LEDs) that emit light of respective colors.

The devices 140 still further include multiple electrochromatic (EC) modules electromechanically coupled to respective EC windows formed from an electrochromic material. The electrochromic material can be, for example, a metal oxide (e.g., $WO_3$) or an organic compound (e.g., a conducting polymer, including polypyrrole (PPy), PEDOT, and polyaniline). The technologies disclosed herein are, of course, not limited to electrochromic materials and any suitable material that can switch from an opaque state to a transparent state can be utilized. Each window of the vehicle 110 can be an EC window. Accordingly, as is illustrated in FIG. 2, the EC modules can include a first EC module 230a electromechanically coupled to an EC windshield window 235a; a second EC module 230b electromechanically coupled to a first EC lateral window 230b; a third EC module 230c electromechanically coupled to a second EC lateral window 230c; a fourth EC module 230d electromechanically coupled to a third EC lateral window 230d; a fifth EC module 230e electromechanically coupled to a fourth EC lateral window 230*e*; and a sixth EC module 230*f* electromechanically coupled to a EC rear window 235*f*.

The EC modules 230*a*-230*f* can be partially integrated into respective windows. For instance, an EC module can include an electrode assembly integrated into the window. The electrode assembly can permit applying voltages that cause the window to transition between a tinted state and a transparent state. For illustration purposes, a tinted state is a state of the EC material of the window that has an optical transmittance that is less than a threshold amount (e.g., 10% or 20%) for each one (or at least a group) of wavelengths in the interval from about 400 nm to about 800 nm. In turn, a transparent state is a state of the EC material of the window that has an optical transmittance that exceeds another threshold amount (e.g., 80% or 90%) for each one (or at least a group) of wavelengths in such an interval. Other suitable values of transmittance also can define an opaque state and yet other suitable values can define a transparent state. Those other values can be determined by operational conditions of the switchable layer, such as ambient light condition. In FIG. 2 (and other FIGS. herein) a tinted state is represented with a dotted section. Transparent states are represented with an unfilled section (no dots present, for example).

In some embodiments, the electrode assembly can include an array of transparent conductors (TCs). The array can include, in one example, a mesh having a defined size or another type of thin-film arrangement of TCs. In another example, such an array can include a lattice of discrete transparent conductors assembled in a defined layout. Each one of the transparent conductors has a defined shape (e.g., an elongated slab, a circle, a square, or the like) and a defined size. The size can have a magnitude in a range from a few micrometers to several centimeters, for example. The TCs can be selected, for example, from a group including NiO, zinc oxide; indium tin oxide (ITO); and a conductive polymer. Other suitable TCs can be utilized. In some embodiments, rather than relying on a TC, the electrode assembly can a suitable array of conductors (metals, conductive polymers, carbon-based materials, etc.), such as a nanowire mesh.

With further reference to FIG. 1, the vehicle 110 also includes a control unit 150 that can communicate with some or all of the devices 140 by means of a communication structure 145. In some embodiments, the communication structure 145 can include one or many bus architectures, such an Ethernet-based industrial bus, a controller area network (CAN) bus, a Modbus, other types of fieldbus architectures, or similar.

As the passenger 120 and the mobile device 130 approach the vehicle 110, the vehicle 110 can receive wireless signals from the mobile device 130. To that end, the vehicle 110 includes a communication unit (e.g., communication unit 250 (FIG. 2)) that can receive the wireless signal according to a specific radio technology protocol, such as Bluetooth® or Wi-Fi. The communication unit can receive the wireless signals from one or many antennas assembled about the vehicle 110. The communication unit and the antennas can be part of multiple devices 140 integrated into the vehicle 110.

The control unit 150 can monitor a distance between the mobile device 130 and the vehicle 110 as the mobile device 130 moves towards the vehicle 110. To that, the control unit 150 can access data uniquely identifying the mobile device 130 and can utilize wireless signals corresponding to the mobile device 130 to generate an estimate of such a distance. In some embodiments, such data can be retained in one or more memory devices 154 (referred to as control data 154).

The control unit 150 can utilize such data to identify wireless signals pertaining to the mobile device 130 from other wireless signals received at the communication unit. The data can include, for example, a telephone number, a subscriber number, an international mobile subscriber identity (IMSI), an electronic serial number (ESN), an internet protocol (IP) address, a session initiation protocol (SIP) address, a uniform resource locator (URL) or a uniform resource identifier (URI), a media access control (MAC) address, or similar.

Figure 3:
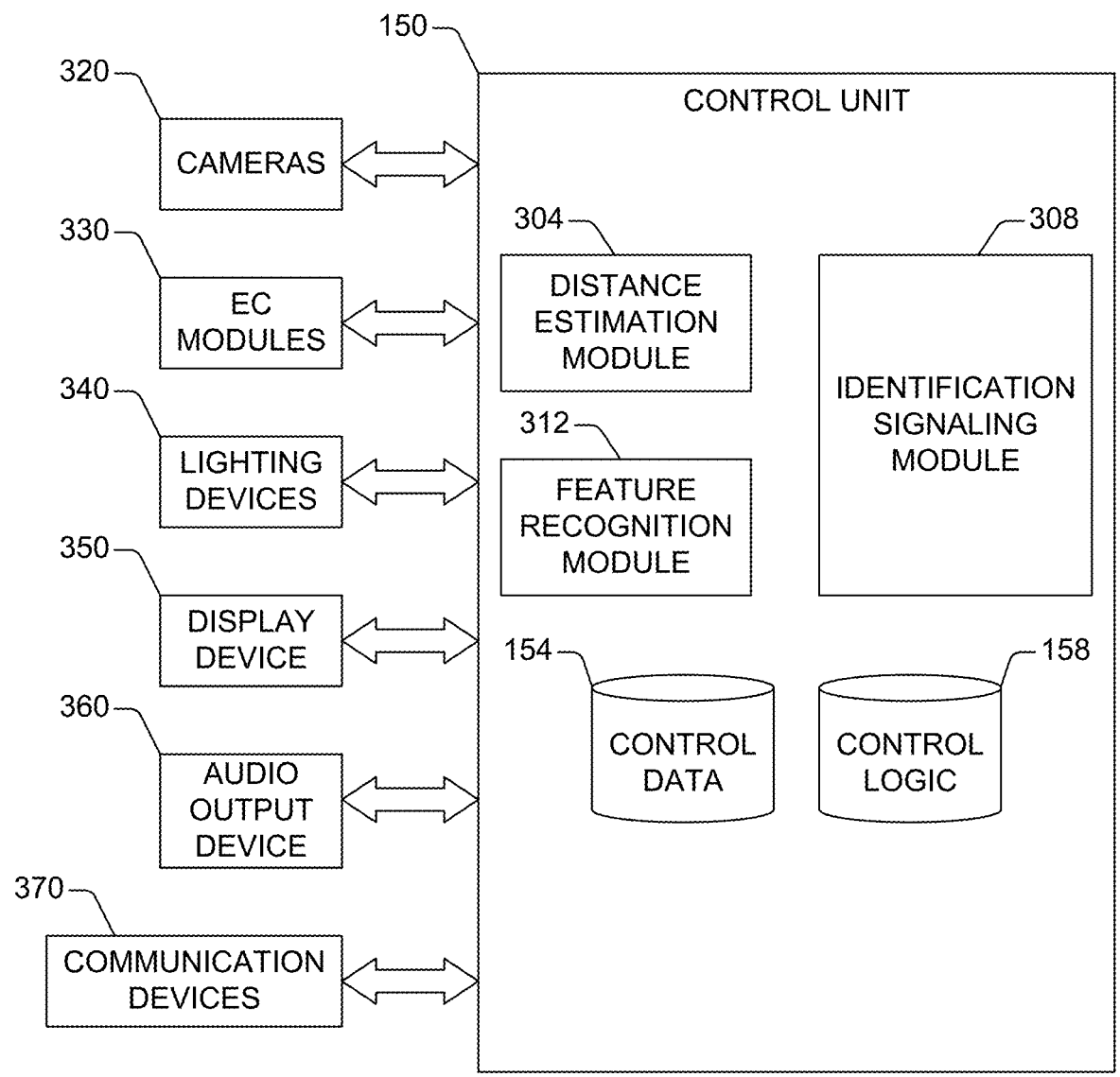
FIG. 3 presents an example of a control unit functionally coupled to multiple devices assembled in a vehicle, in accordance with one or more embodiments of this disclosure.

The wireless signals can include, for example, pilot wireless signals that the control unit 150 can utilize to perform a TOF process. Performing the TOF process results in the estimate of the distance between the mobile device 130 and the vehicle 110. The TOF process can include, in some configurations, a triangulation process based on Bluetooth® pilot signals. In some embodiments, as is illustrated in FIG. 3, the control unit 150 can include a distance estimation module 304 that can implement the TOF process. The distance estimation module 304 can utilize wireless signals received from communication devices 370. The communication devices 370 can include, for example, the communication device 250 and at least one of the antennas 240*a*, 240*b*, or 240*c*. See FIG. 2.

Back to FIG. 1, while approaching the vehicle 110, the mobile device 130 can reach a defined range 160 relative to the vehicle 110. The range 160 can be defined to be sufficiently close to the vehicle 110 so that gestures of the passenger 130 can be associated with the passenger 130 seeking to identify and board the vehicle 110. For example, the defined range 160 can be about 15 meters. The range 160 can be defined with respect to a coordinate system 170 in the vehicle 110. While the coordinate system 170 is illustrated in FIG. 1 as a Cartesian coordinate system, the coordinate system 170 can be embodied in other types of curvilinear coordinate systems, such as a spherical coordinate system, a cylindrical coordinate system, or the like. Data defining the range 160 can be retained in the control data 154.

In response to the mobile device 130 being within the defined range 160, the control unit 150 can identify the passenger 120 by performing a facial recognition process. Specifically, the control unit 150 can identify one or several faces in the vicinity of the position of the mobile device 130. Then, the control unit 150 can compare each one of the identified faces to a reference face of the passenger 120. When the comparison results in an identified face that matches the reference face with a degree of certainty that exceeds a defined threshold magnitude, the control unit 150 can initiate tracking of the face as the mobile device 130 approaches the vehicle 110. Data identifying the reference face can be retained in the control data 154. In addition, in some embodiments, as is illustrated in FIG. 3, the control unit 150 can include a feature recognition module 312 that can implement the facial recognition process. To that end, the feature recognition module 312 can utilized imaging data generated by at least one of cameras 320 assembled about the vehicle 110. In one example, the cameras 320 include cameras 210*a*-210*e*. As is discussed herein, the imaging data can represent one or several images of the surroundings of the vehicle 110. The cameras 320 can be coupled to the control unit 150 by means of a bus architecture.

The identification of the passenger 120 is additional to the prior identification of the mobile device 120. Not only is such a double authentication absent in conventional vehicular technologies, but also can enhance safety for an occupant of the vehicle 110 in rideshare scenarios.

With reference again to FIG. 1, in further response to identifying the passenger 120, in some embodiments, the control unit 150 can cause an audio output device to emit an audible signal within the vehicle 110. An example of the audio output device can be one of the audio output device 260a or audio output device 260b shown in FIG. 2. The audible signal can alert a human driver or another occupant of the vehicle 110 that the passenger 120 is approaching the vehicle 110. The audible signal can be embodied, for example, in a particular tone, a ringtone, or another type of musical sound. The audio output device (e.g., a speaker device) can be included in the multiple devices 140. The control unit 150 can implement control logic retained in one or more memory devices 158 (referred to as control logic 158) to cause the audio output device to emit the audible signal.

In addition, or in other embodiments, the control unit 150 can cause a display device (not depicted in FIG. 1) to present a message indicating that the passenger 120 is approaching the vehicle 110. The display device (e.g., touch-screen display device) can be included in the devices 140. The display device can be included, for example, in an in-vehicle infotainment (IVI) system or in a section of a dashboard of the vehicle 110. In another example, the display device can be a heads-up display (HUD) device. The control unit 150 can implement control logic retained in one or more memory devices 158 (referred to as control logic 158) to cause the display device to present such a message.

In some embodiments, as is illustrated in FIG. 3, the control unit 150 can include an identification signaling module 308 that can implement the control logic 158 to cause a display device 350 to present the message identifying the passenger 120. The identification signaling module 308 also can implement the control logic 158 to cause at least one of audio output devices 360 to emit the audible signal described above.

With further reference to FIG. 1, the control unit 150 also can identify gestures of the passenger 120 while the passenger continues to approach the vehicle 110 within the defined range 160. To that end, the control unit 150 can implement various image feature recognition processes on images of the passenger 120. The control unit 150 can assign respective confidence scores to the identified gestures. A confidence score can indicate, for example, a degree of certainty that a gesture is directed to a particular action of the passenger 120. For instance, in case the gesture is gaze, the confidence score can indicate the degree of certainty that the passenger 120 is viewing a particular section of the vehicle 110. For a particular type of gesture, such as head orientation or gaze, the magnitude of a confidence score can increase as the distance between the passenger 120 and the vehicle 110 decreases. In some embodiments, the control unit 150 can include the feature recognition module 312 (FIG. 3) to implement the image feature recognition process to identify gesture and generate respective confidence scores.

In response to identifying a particular gesture having a satisfactory confidence score, the control unit 150 can cause one or many of the devices 140 to operate in a particular fashion. A confidence score that exceeds a threshold magnitude can be a satisfactory confidence score. In some instances, the control unit 150 can permit determining a gaze of the passenger 120. In some situations, the control unit 150 can determine that a gaze of the passenger 120 is directed towards the front of the vehicle 110. The gaze is determined with a satisfactory confidence score. In response, the control unit 150 can cause a lighting device to emit light 180 in a specific fashion. The lighting device (not depicted in FIG. 1) can be included in the multiple devices 140 and can be assembled in proximity to a license plate 115 of the vehicle 110. The lighting device can be embodied in, for example, a group of LEDs that emit light of respective colors. As another example, the lighting device can be an RGB lamp.

In an example configuration, the control unit 150 can cause the lighting device to emit light of a defined color (e.g., blue light, red light, green light). The light can be essentially monochromatic or can be the result of a combination of electromagnetic radiation having particular wavelengths. In addition, or in another example configuration, the control unit 150 can cause the lighting device to flash light in a specific pattern, emitting light during a defined sequence of time intervals intercalated with obscurity periods. The specific pattern can permit verifying that the vehicle 110 is a desired rideshare vehicle.

The control unit 150 can implement control logic retained the control logic 158 to cause the lighting device to emit light as described herein. In some embodiments, as is illustrated in FIG. 3, the control unit 150 includes the identification signaling module 308 to implement the control logic 158 that causes at least one of lighting devices 340 to emit light based on a determined gaze or head orientation of the passenger 120 in accordance with aspects described herein. The lighting devices 340 can include lighting devices 220a, 220b, 270a, and 270b.

In other situations, the control unit 150 can determine that a gaze of the passenger 120 is directed towards the driver's window in the vehicle 110. The gaze is determined with a satisfactory confidence score. In response, the control unit 150 can cause the window to transition from a tinted state to a transparent state. The control unit 150 can implement control logic retained the control logic 158 to cause an EC module electromechanically coupled to the window to switch the window from the tinted state to the transparent state. In some embodiments, as is illustrated in FIG. 3, the control unit 150 includes the identification signaling module 308 to implement the control logic 158 that causes at least one of EC modules 330 to cause an EC window of the vehicle 110 to transition between a tinted state and a transparent state in accordance with aspects described herein.

Such a transition is represented as a group of curved segments 190 in FIG. 1, and provides a visual signal to the passenger 120. To that end, the window can be formed from an electrochromic material, and the control unit 150 can direct an electro-chromatic module (not depicted in FIG. 1) to cause the window to transition from the tinted state to the transparent state. In other configurations, or in addition to causing the driver's window to transition to a transparent state, the control unit 150 can cause a lighting device to illuminate the cabin of the vehicle 110. Such a lighting device can be included in the devices 140 and can be assembled within the cabin of the vehicle 110.

As such, in an example scenario, the driver's window can be in an opaque state (or is tinted) prior to the mobile device 130 being within the defined range 160. As the mobile device 130 approaches the vehicle 130, the control unit 150 can determine that the passenger 120 is viewing the driver's window. In response, the control unit 150 can the cause the driver's window to de-tint and also can cause a lighting device to illuminate the cabin of the vehicle 110.

The various visual signals caused, in part, by the control unit 150 can permit the identification of at least one of vehicle, an entry point to the vehicle, or a condition of the vehicle.

In some embodiments, the passenger 120 need not have booked a trip in the vehicle 110. The vehicle 110 can determine that the mobile device 130 is within a defined short distance from the vehicle 110. For example, the defined short distance can be 1.5 m. In some embodiments, the control data 154 can include data defining such a short distance. The distance between the mobile device 130 and the passenger 120 can be determined using a TOF process in accordance with aspects described herein.

Figure 4A:
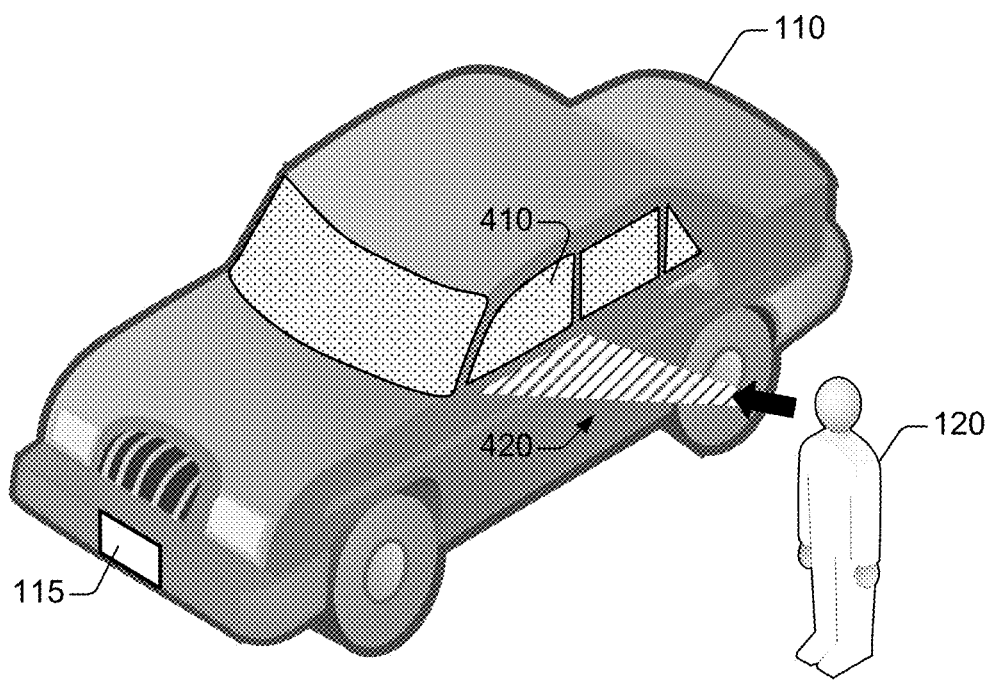
FIG. 4A presents an example of a vehicular configuration for identification of a vehicle, in accordance with one or more embodiments of this disclosure.

In response to the mobile device 130 being within the defined short distance, the control unit 150 can determine a gaze of the passenger 120. The gaze can be oriented towards a particular portion of the vehicle 110. For instance, as is depicted in FIG. 4A, the gaze of the passenger 120 can be oriented toward a window 410 of the vehicle 110. The gaze is represented with a black arrow. A portion of the field of view corresponding to the gaze is represented with several straight segments 420.

In response to determining the gaze, the control unit 150 can access state data indicating the availability of the vehicle 110 for a trip or a rental period. In some embodiments, the state data can be retained in control data 154. When the state data indicates that vehicle is unavailable, the control unit 150 can maintain each window of the vehicle 110 in a tinted state. For example, the window 410 can remain in a tinted state despite the passenger 120 looking toward the window 410.

Figure 4B:
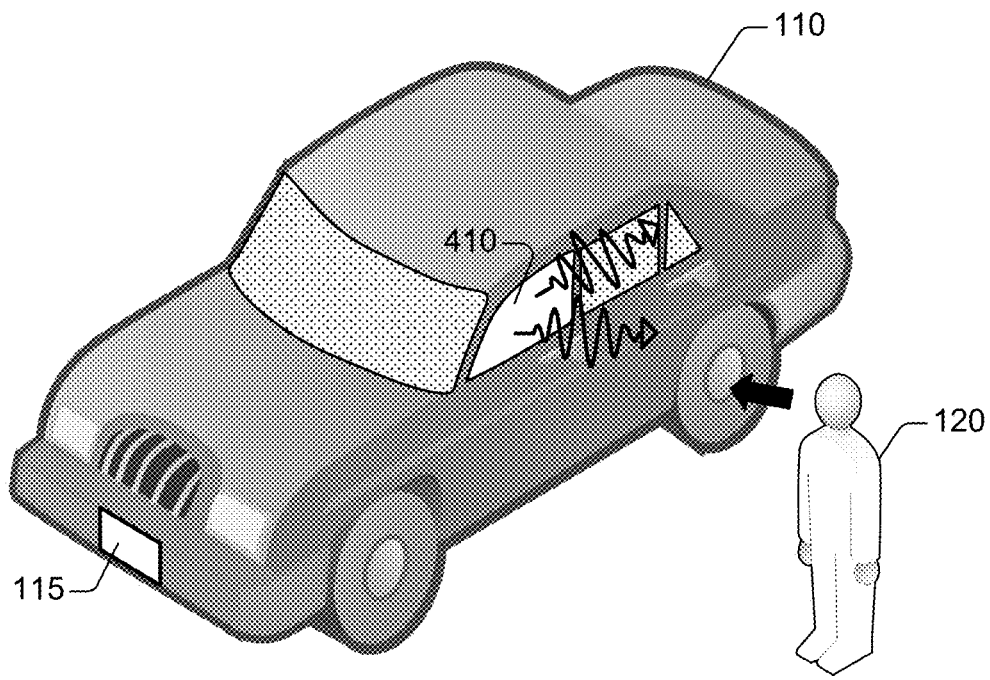
FIG. 4B presents another example of a vehicular configuration for identification of a vehicle, in accordance with one or more embodiments of this disclosure.

In the alternative, in some configurations, when the state data indicates that the vehicle 110 is available, the control unit 150 can cause a window of the vehicle 110 to transition from a tinted state to a transparent state. Such a window can correspond to the particular portion of the vehicle 110 that corresponds to the orientation of the gaze of the passenger 120. In addition, or in another configuration, the control unit 150 can cause a lighting device to illuminate at least a section the interior of vehicle 110. As an illustration, as is depicted in FIG. 4B, the control unit 150 can cause the window 410 to transition to a transparent state and a lighting device (not shown) to emit light in a section proximate to the window 410 in the interior of the vehicle 110. The emitted light can be visible light or light in the UV portion of the electromagnetic radiation spectrum.

Figure 4C:
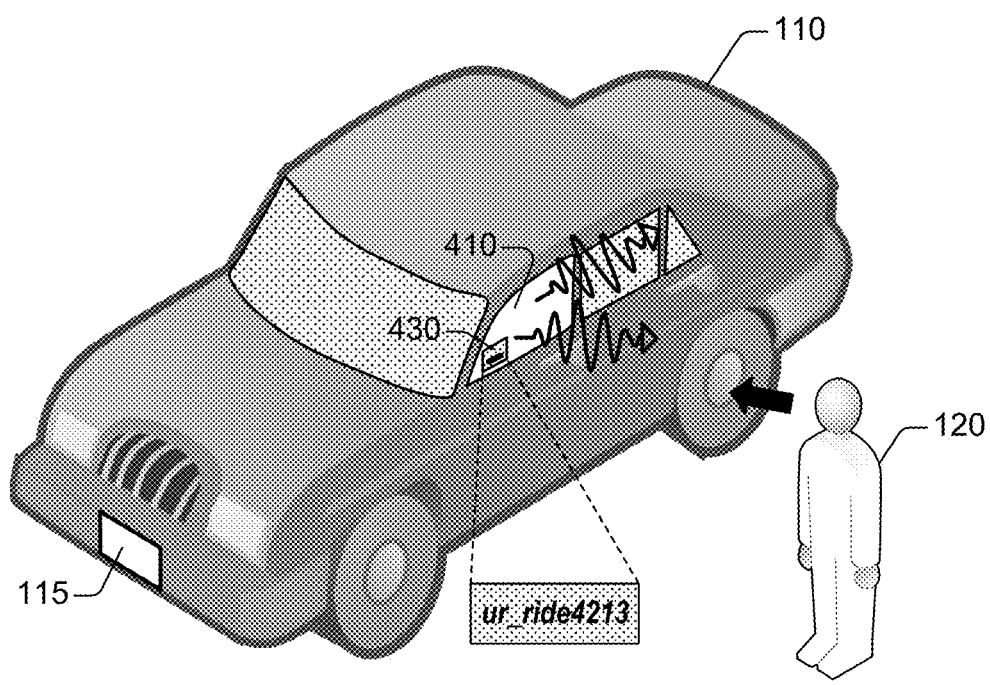
FIG. 4C presents another example of a vehicular configuration for identification of a vehicle, in accordance with one or more embodiments of this disclosure.
Figure 4D:
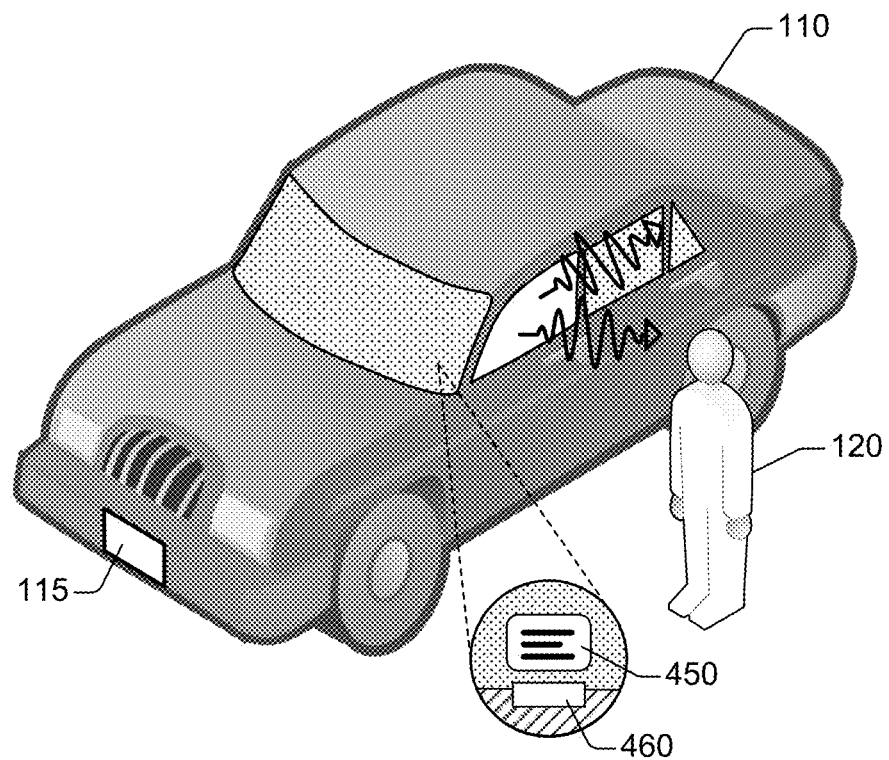
FIG. 4D presents an example of a vehicular configuration for identification of a vehicle and a condition of the vehicle, in accordance with one or more embodiments of this disclosure.

Further, or in some embodiments, the control unit 150 can cause a display device to present information in a window of the vehicle 110 in response to the vehicle 110 being available. In one example, the information can be presented on the window included in the field of view of the passenger 120. As is shown in FIG. 4C, the control unit 150 can maintain a portion of the window 410 in a tinted state, and can cause the display device to present indicia identifying the vehicle 110. In another example, the information can be presented in the windshield window 440 of the vehicle 110. The control unit 150 can cause a HUD device 460 to present the information on an interior surface of the windshield window 440. Markings 450 can convey the information, such as predicted range of the vehicle 110, mileage of the vehicle 110, driving style of previous human driver, a combination of the foregoing, or the like.

Figure 5:
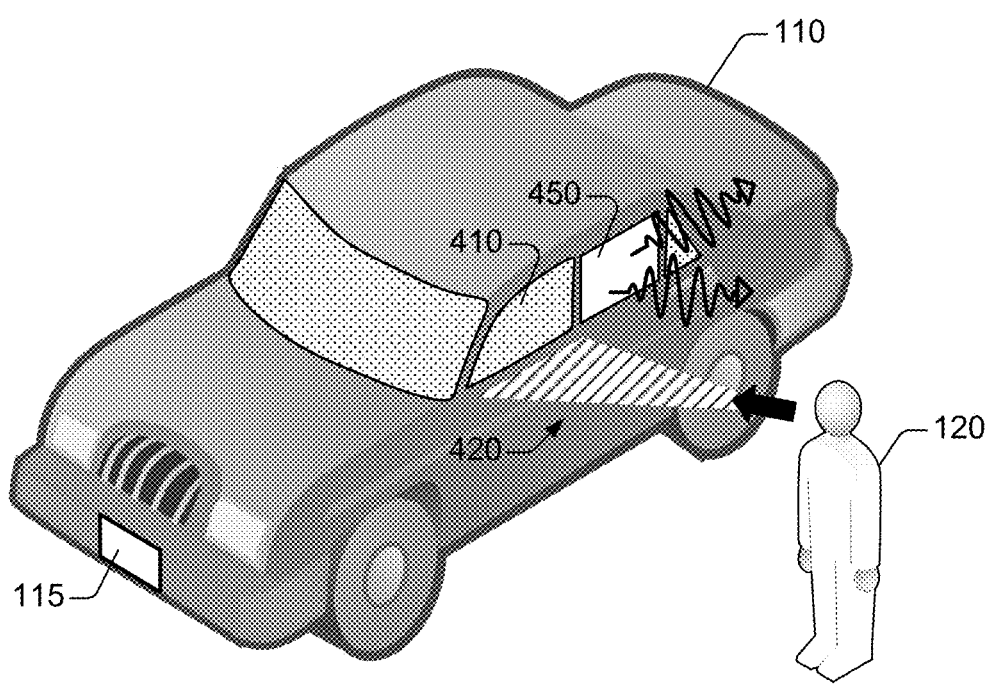
FIG. 5 presents an example of visual signals for identification of a point of entry to a vehicle, in accordance with one or more embodiments of this disclosure.

In some instances, the window that is switched from a tinted state to a transparent state need not be the window that corresponds to the gaze orientation of the passenger 120. As is shown in FIG. 5, when state data indicates that the vehicle 110 is available, the control unit 150 can cause a window corresponding to a point of entry to the vehicle 110 to transition from a tinted state to a transparent state. In addition, or in some configurations, that control unit 150 can cause a lighting device assembled proximate to a section adjacent to such a window to emit light. The lighting device can be energized, and thus light can be emitted, for a defined time interval (e.g., 30 seconds, 45 seconds, 60 seconds, or similar). In some embodiments, the control data 154 (FIG. 1 and FIG. 3) can retain data defining such a time interval. Emitted light in FIG. 5 is represented with wavy lines ending in an arrowhead.

In the scenarios illustrated in FIGS. 4A-4D and FIG. 5, the control unit 150 within the vehicle 110 can include the identification signaling module 308 to implement the control logic 158 in order to causes lighting devices and EC modules in accordance with aspects described herein.

Figure 6:
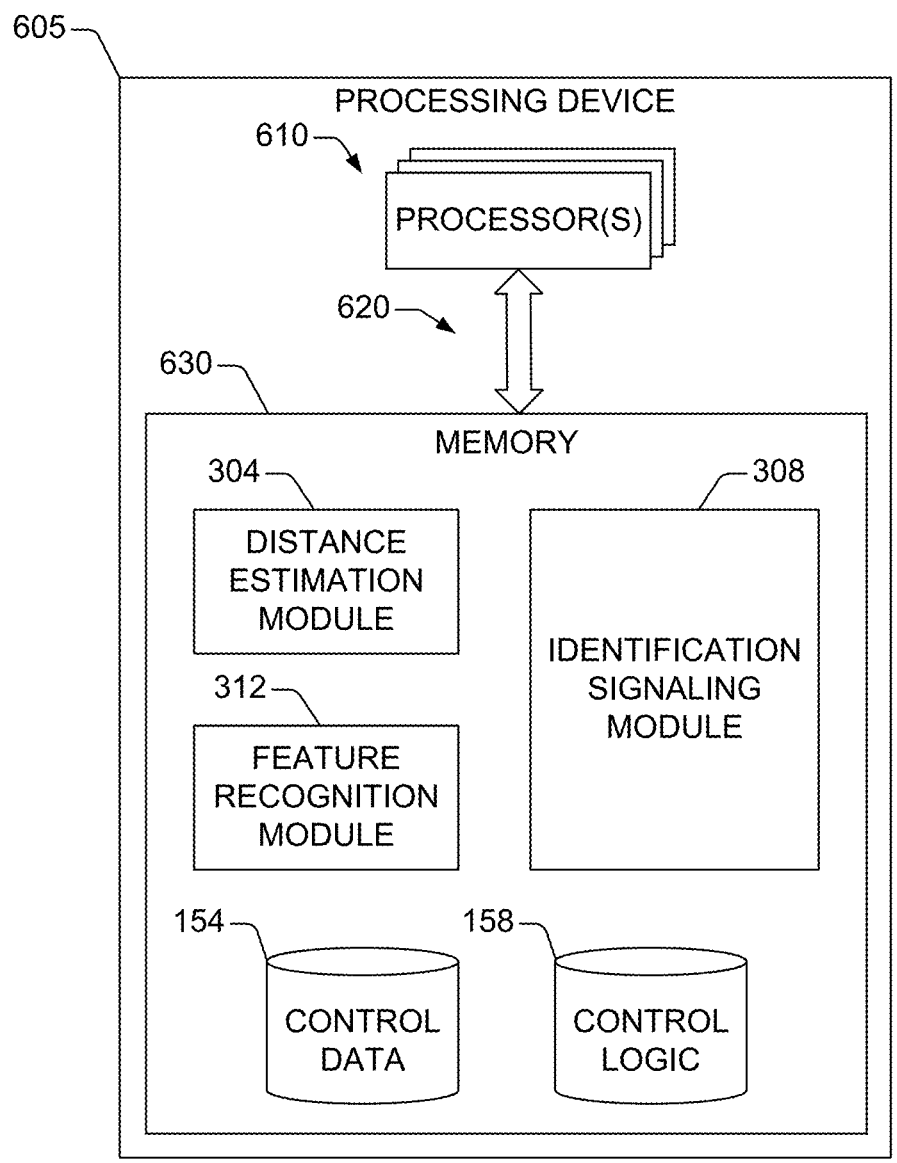
FIG. 6 presents an example of a processing device for control of visual signals to identification a vehicle or a condition of the vehicle, in accordance with one or more embodiments of the disclosure.

FIG. 6 is a block diagram of an example of a processing device 805 for control of operation of multiple devices assembled in a vehicle, in accordance with one or more embodiments of the disclosure. In one example, the multiple devices can include the devices 140 and the vehicle can be vehicle 110. The processing device 605 can embody, or can constitute, the control unit 150. The processing device 605 can include one or more processors 610 and one or more memory devices 630 (referred to as memory 830) that include machine-accessible instructions (e.g., computer-readable and/or computer-executable instructions) that can be accessed and executed by at least one of the processor(s) 610. The processor(s) 610 can be embodied in, or can include, for example, a graphics processing unit (GPU); a plurality of GPUs; a central processing unit (CPU); a plurality of CPUs; an application-specific integrated circuit (ASIC); a microcontroller; a programmable logic controller (PLC); a field programmable gate array (FPGA); a combination thereof; or the like. In some embodiments, the processor(s) 810 can be arranged in a single computing device (e.g., an electronic control unit (ECU), and in-car infotainment (ICI) system, or the like). In other embodiments, the processor(s) 810 can be distributed across two or more computing devices (e.g., multiple ECUs; a combination of an ICI system and one or several ECUs; or the like).

The processor(s) 610 are functionally coupled to the memory 630 by means of a communication architecture 620. The communication architecture 620 is suitable for the particular arrangement (localized or distributed) of the processor(s) 610. In some embodiments, the communication architecture 620 can include one or more bus architectures, such an Ethernet-based industrial bus, a CAN bus, a Modbus, other types of fieldbus architectures, a combination thereof, or the like.

As is illustrated in FIG. 6, the memory 630 includes the distance estimation module 304, the identification signaling module 308, and the feature recognition module 312. Machine-accessible instructions embody or otherwise constitute each one of such modules. In some embodiments, the machine-accessible instructions are encoded in the memory 630 and can be arranged in components that can be built (e.g., linked and compiled) and retained in computer-executable form in the memory 630 (as is shown) or in one or more other machine-accessible non-transitory storage media. In other embodiments, the machine-accessible instructions can be assembled as circuitry or other types of hardware components.

At least one of the processor(s) 610 can execute, individually or in combination, the distance estimation module 304, the identification signaling module 308, and the feature recognition module 312 to cause the processing device 605 to control multiple devices assembled in a vehicle in accordance with this disclosure. The memory 630 also includes the control data 154 and the control logic 158 that can be utilized, individually or in combination, as part of the execution of one or more of such modules.

While not illustrated in FIG. 6, in some embodiments, the processing device 605 also can include other types of computing resources that can permit or otherwise facilitate the execution of the one or more of the distance estimation module 304, the identification signaling module 308, and the feature recognition module 312. The computing resources can include, for example, interface(s) (such as I/O interfaces, application programming interfaces (APIs), and/or a wireless communication adapter). In addition, or as another example, the computing resource(s) can include controller devices(s), power supplies, an operating system, firmware, a combination thereof, or the like.

Figure 7:
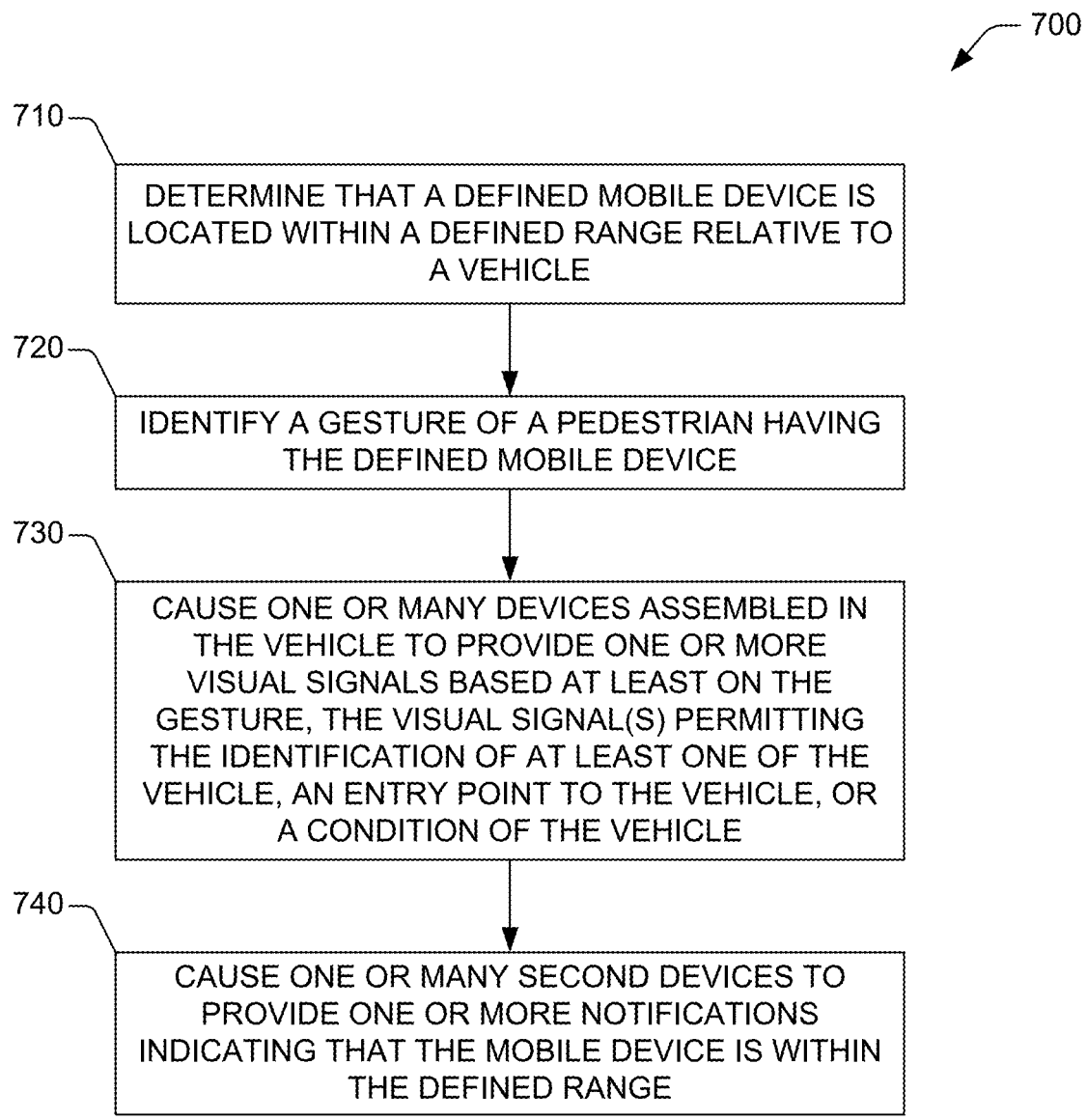
FIG. 7 presents an example of a method for providing visual signals for identification of a vehicle or a condition of the vehicle, in accordance with one or more embodiments of this disclosure.
Figure 8:
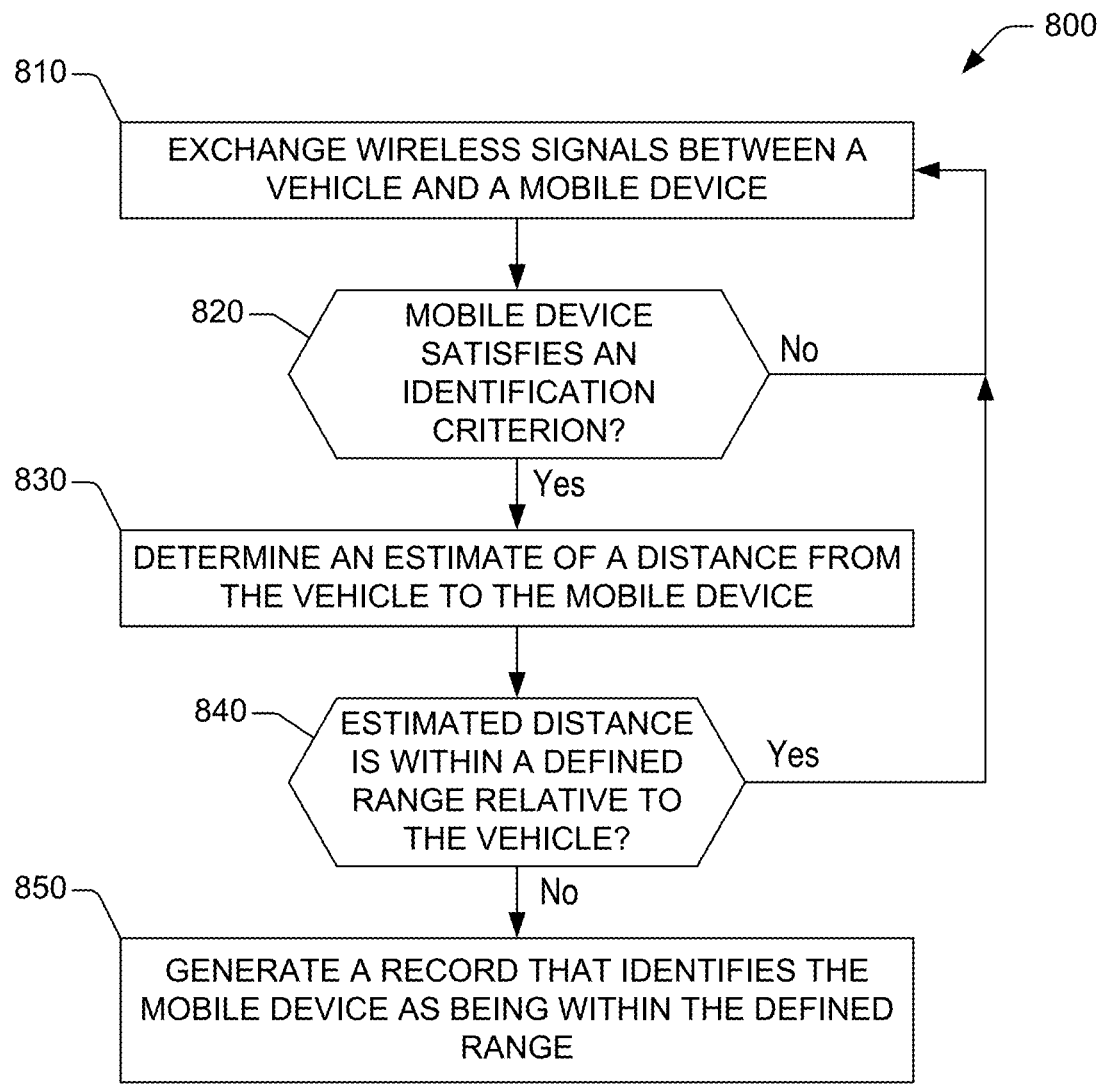
FIG. 8 presents an example of a method for determining that a mobile device is within a particular range from a vehicle, in accordance with one or more embodiments of this disclosure.
Figure 9:
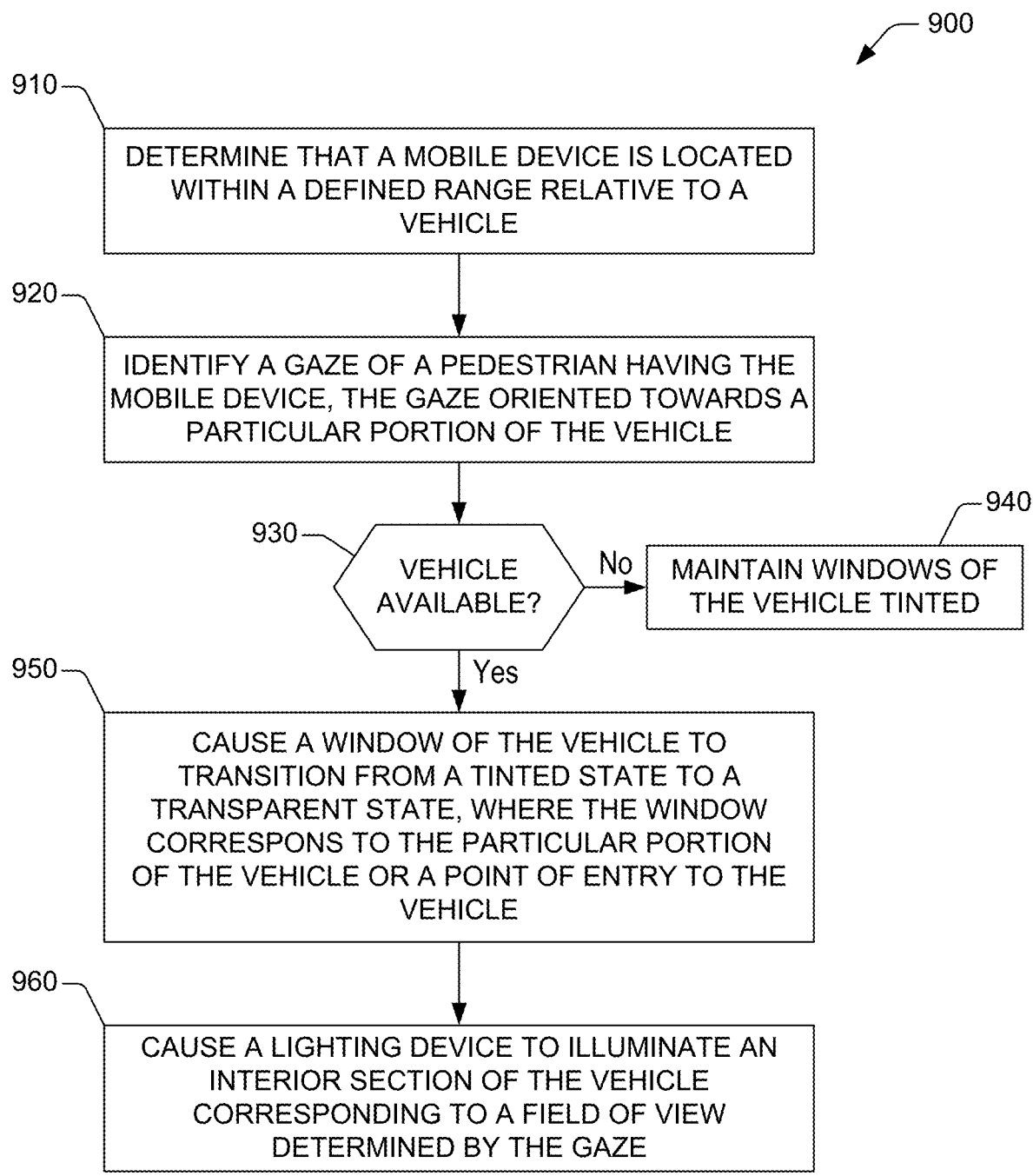
FIG. 9 presents another example of a method for providing visual signals for identification of a vehicle or a condition of the vehicle, in accordance with one or more embodiments of this disclosure.

FIG. 7, FIG. 8, and FIG. 9 illustrate examples of methods that emerge from the principles of this disclosure. For purposes of simplicity of explanation, the exemplified methods in FIG. 7, FIG. 8, and FIG. 9 (and other techniques disclosed herein) are presented and described as a series of operations. It is noted, however, that the exemplified method and any other techniques of this disclosure are not limited by the order of operations. Some operations may occur in different order than that which is illustrated and described herein. In addition, or in the alternative, some operations can be performed essentially concurrently with other operations (illustrated or otherwise). Further, not all illustrated operations may be required to implement an exemplified method or technique in accordance with this disclosure. Furthermore, in some embodiments, two or more of the exemplified methods and/or other techniques disclosed herein can be implemented in combination with one another to accomplish one or more elements and/or technical improvements disclosed herein.

Techniques disclosed throughout the subject specification and annexed drawings are capable of being stored on an article of manufacture to facilitate transporting and transferring such methodologies to computers or other types of information processing machines or processing circuitry for execution, and thus implementation by a processor or for storage in a memory device or another type of computer-readable storage device. In one example, one or more processors that perform a method or combination of methods disclosed herein can be utilized to execute programming code instructions retained in a memory device or any computer-readable or machine-readable storage device or non-transitory storage media, to implement one or several of the techniques disclosed herein. The programming code instructions, when executed by the one or more processors can implement or carry out the various operations in the exemplified methods and/or other technique disclosed herein.

The programming code instructions, therefore, provide a computer-executable or machine-executable framework to implement the exemplified methods and/or other techniques disclosed herein. More specifically, yet not exclusively, each block of the flowchart illustrations and/or combinations of blocks in the flowchart illustrations can be implemented by the programming code instructions.

FIG. 7 presents an example of a method for providing visual signals that indicate one or many conditions of a vehicle, in accordance with one or more embodiments of this disclosure. A computing apparatus included in a vehicle (e.g., vehicle 110) can implement, entirely or partially, the example method 700. The computer apparatus can be integrated into the vehicle. The computing apparatus can embody, or can constitute, the control unit 150 (FIG. 1 and FIG. 3). The computing apparatus has a processing device that includes or is functionally coupled to one or more processors, one or more memory devices, other types of computing resources, a combination thereof, or the like. Such processor(s), memory device(s), and computing resource(s), individually or in a particular combination, permit or otherwise facilitate implementing the example method 700. The computing resources can include operating systems (O/Ss); software for configuration and/or control of a virtualized environment; firmware; central processing unit(s) (CPU(s)); graphics processing unit(s) (GPU(s)); virtual memory; disk space; interface(s) (I/O interface devices, programming interface(s) (such as application programming interfaces (APIs), etc.); controller devices(s); power supplies; a combination of the foregoing; or the like.

At block 710, the processing device included in the computing apparatus can determine that a defined mobile device is located within a defined range relative to a vehicle. To that end, in some embodiments, the processing device can perform the process illustrated in FIG. 7. At block 720, the processing device can identify a gesture of a pedestrian having the defined mobile device. The processing device can identify numerous gestures. For example, identifying the gesture includes determining an estimate of an orientation of the face of the pedestrian relative to the vehicle.

In some situations, the device(s) assembled in the vehicle include an illumination device and the orientation of the face of the pedestrian is directed towards a frontal portion of the vehicle. In such situations, the processing device can cause the lighting device to emit essentially monochromatic light or to emit a defined sequence of lighting periods intercalated with obscurity periods. In other situations, the device(s) assembled in the vehicle include an EC module and the orientation of the face of the pedestrian is directed towards a side portion of the vehicle. In those situations, the processing device can cause electro-chromatic module to switch an optical state of a window of the vehicle to a transparent state.

At block 730, the processing device can cause one or many devices assembled in the vehicle to provide one or more visual signals based at least on the gesture. The visual signal(s) can permit the identification of at least one of vehicle, an entry point to the vehicle, or a condition of the vehicle. At block 740, the processing device can cause one or many second devices to provide one or many notifications indicating that the mobile device is within the defined range.

FIG. 8 presents an example of a method for determining that a mobile device is within a particular range from a vehicle, in accordance with one or more embodiments of this disclosure. The computing apparatus that can implement the example method 700 shown in FIG. 7 also can implement, entirely or partially, the example method 800. At block 810, a processing device included in the computing apparatus can receive wireless signals from a mobile device. The wireless signals can be received in response to the mobile device approaching a vehicle. The wireless signals can include, for example, pilot wireless signals exchanged between the mobile device and a communication component integrated into the vehicle. A pedestrian can carry the mobile device as the pedestrian approaches the vehicle. At block 820, the processing device can determine if the mobile device satisfies an identification criterion. The identity criterion can define a communication address to be compared with a communication address of the mobile device. As mentioned, the communication address includes information that uniquely identifies the mobile device. For instance, the communication address can include a telephone number, a subscriber number, an IMSI, an ESN, an IP address, a SIP address, a URL or a URI, MAC, or similar.

Accordingly, the processing device can determine the communication address of the mobile device using at least a portion of the wireless signals received at block 810. The processing device can then compare such a communication address to the defined communication address. When the communication address and the defined communication coincide, the processing device can determine that the mobile device satisfies the identification criterion. In the alternative, when the communication address and the defined communication address are different, the processing device can determine that the identification criterion is not satisfied.

A positive determination at block 820 ("Yes" branch) results in the example method 800 continuing to block 830, where the processing device can determine an estimate of a distance from the vehicle to the mobile device. To that end, the processing device can perform triangulation or another type of time-of-flight analysis using the wireless signals received at block 810.

At block 840, the processing device can determine if the estimate of the distance is within a defined range relative to the vehicle. To that, the processing device can determine if the estimate of the distance exceeds a threshold distance that defines the particular range. In response to a positive determination—when the mobile device is outside the defined range—the processing device can continue collecting wireless signals from the mobile device. Thus, the example method 800 continues to block 810.

The example method continues to block 850 in response to a negative determination at block 840—when the mobile device is within the particular range. At block 850, the processing device can generate a record or another type of data identifying the mobile device as being with the defined.

FIG. 9 presents an example of a method 900 for assessing a condition of a vehicle, in accordance with one or more embodiments of this disclosure. The vehicle can be vehicle for hire (e.g., a taxicab or a rideshare vehicle) or a rental automobile. The vehicle can be operated by a human or can be an autonomous vehicle. The computing apparatus that can implement the example methods 600 and 700 shown in FIG. 7 and FIG. 8, respectively, also can implement the example method 800. At block 910, a processing device included in the computing apparatus can determine that a mobile device is located within a defined range relative to the vehicle. At block 920, the processing device can identify a gaze of a pedestrian having the mobile device. The gaze can be oriented towards a particular portion of the vehicle.

At block 930, the processing device can determine if the vehicle is available. In response to determining that the vehicle is unavailable ("No" branch) the example method 900 continues to block 940 where the processing device can cause the vehicle to maintain each window of the vehicle in a tinted state. In response to determining that the vehicle is available ("Yes" branch) the example method 900 can continue to block 950 where the processing device can cause a window of the vehicle to transition from a tinted state to a transparent state. The window can correspond, for example, to the particular portion of the vehicle or to a point of entry to the vehicle.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "inter-face," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

As is utilized in this disclosure, the term "processor" can refer to any type of processing circuitry or device. A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory.

Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

In some embodiments, processors can utilize nanoscale architectures in order to optimize space usage or enhance the performance of systems, devices, or other electronic equipment in accordance with this disclosure. For instance, a processor can include molecular transistors and/or quantum-dot based transistors, switches, and gates.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The flowchart and block diagrams in the figures illustrate the architecture, functionality, and operation of possible implementations of examples of systems, methods, and computer program products according to various embodiments of the present disclosure. In this regard, each block in the flowchart or block diagrams may represent a module, segment, or portion of instructions, which includes one or more machine- or computer-executable instructions for implementing the specified operations. It is noted that each block of the block diagrams and/or flowchart illustration, and combinations of blocks in the block diagrams and/or flowchart illustration, can be implemented by special purpose hardware-based systems that perform the specified functions or operations or carry out combinations of special purpose hardware and computer instructions.

Computer-readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable non-transitory storage medium within the respective computing/processing device. What has been described herein in the present specification and annexed drawings includes examples of systems, devices, techniques, and computer program products that, individually and in combination, permit the reversible configuration of content presentation direction in transparent displays. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A method, comprising:
    determining that a defined mobile device is within a defined range from a vehicle;
    in response to the determining, identifying a gesture of a pedestrian relative to the vehicle, the pedestrian having the mobile device;
    causing one or more devices assembled in the vehicle to provide one or more visual signals based at least on the gesture, wherein the one or more visual signals permit identifying at least one of the vehicle an entry point to the vehicle, or a condition of the vehicle,
    wherein the identifying comprises determining an estimate of an orientation of the face of the pedestrian relative to the vehicle.

2. The method of claim 1, further comprising causing one or more second devices assembled in the vehicle to provide one or more notifications indicating that the mobile device is within the defined distance from the vehicle.

3. The method of claim 2, the one or mode second devices comprising a display device, wherein the causing the one or more second devices to provide one or more notifications comprises causing the display device to present a message indicating that the pedestrian is within the defined distance from the vehicle.

4. The method of claim 2, the one or more second devices comprising a speaker device, and wherein the causing the one or more second devices to provide one or more notifications further comprises causing the speaker device to emit an audible signal.

5. The method of claim 1, wherein the determining comprises,
receiving wireless signals from the defined mobile device;
determining an estimate of a distance of the defined mobile device relative to the vehicle by performing triangulation using the wireless signals; and
determining that the estimate of the distance is less than the defined range from the vehicle.

6. The method of claim 1, wherein the orientation is directed towards a frontal portion of the vehicle, and wherein the causing comprises causing a lighting device to emit essentially monochromatic light or to emit a defined sequence of lighting periods intercalated with obscurity periods.

7. The method of claim 1, wherein the orientation is directed towards a side portion of the vehicle, and wherein the causing comprises causing an electro-chromatic module to switch an optical state of a window of the vehicle to a transparent state.

8. An apparatus, comprising:
at least one processor; and
at least one memory device functionally coupled to the at least one processor, the at least one memory device having instructions encoded therein that, in response to execution, cause the apparatus to perform operations comprising,
determining that a defined mobile device is within a defined range from a vehicle;
in response to the determining, identifying a gesture of a pedestrian relative to the vehicle, the pedestrian having the mobile device;
causing one or more devices assembled in the vehicle to provide one or more visual signals based at least on the gesture, wherein the one or more visual signals permit identifying at least one of the vehicle an entry point to the vehicle, or a condition of the vehicle,
wherein the identifying comprises determining an estimate of an orientation of a gaze of the pedestrian relative to the vehicle, and
wherein:
(i) the orientation is directed towards a frontal portion of the vehicle, and wherein the causing comprises causing a lighting device to emit essentially monochromatic light or to emit a defined sequence of lighting periods intercalated with obscurity periods, or
(ii) the orientation is directed towards a side portion of the vehicle, and wherein the causing comprises causing an electro-chromatic module to switch an optical state of a window of the vehicle to a transparent state.

9. The apparatus of claim 8, wherein the operations further comprise causing one or more second devices assembled in the vehicle to provide one or more notifications indicating that the mobile device is within the defined range from the vehicle.

10. The apparatus of claim 8, wherein the determining comprises,
receiving wireless signals from the defined mobile device;
determining an estimate of a distance of the defined mobile device relative to the vehicle by performing a time-of-flight process using the wireless signals; and
determining that the estimate of the distance is less than the defined range from the vehicle.

11. A vehicle, comprising:
multiple devices integrated into the vehicle; and
a control unit functionally coupled to the multiple devices, the control unit comprising,
at least one processor; and
at least one memory device functionally coupled to the at least one processor, the at least one memory device having instructions encoded therein that, in response to execution, cause the control unit to perform operations comprising,
determining that a defined mobile device is within a defined range from a vehicle;
in response to the determining, identifying a gesture of a pedestrian relative to the vehicle, the pedestrian having the mobile device;
causing at least one first device of the multiple devices to provide one or more visual signals based at least on the gesture, wherein the one or more visual signals permit identifying at least one of the vehicle an entry point to the vehicle, or a condition of the vehicle,
wherein the identifying comprises determining at least one of an estimate of an orientation of the face of the pedestrian or an orientation of a gaze of the pedestrian relative to the vehicle, and
wherein:
(i) the multiple devices comprise a lighting device assemble proximate to a license plate of the vehicle, and wherein the orientation is directed towards a frontal portion of the vehicle, the causing comprising causing the lighting device to emit essentially monochromatic light or to emit a defined sequence of lighting periods intercalated with obscurity periods, or
(ii) the multiple devices comprise an electro-chromatic module including an electro-chromatic window, and wherein the orientation is directed towards a side portion of the vehicle, the causing comprising causing the electro-chromatic module to cause the electro-chromatic window to switch to a transparent state.

12. The vehicle of claim 11, wherein the operations further comprise causing at least one second device of the multiple devices to provide one or more notifications indicating that the mobile device is within the defined range from the vehicle.

13. The vehicle of claim 12, wherein the determining comprises,
receiving wireless signals from the defined mobile device;
determining an estimate of a distance of the defined mobile device relative to the vehicle by performing triangulation using the wireless signals; and
determining that the estimate of the distance is less than the defined range from the vehicle.

* * * * *